(12) United States Patent
Momtaz

(10) Patent No.: US 7,769,110 B2
(45) Date of Patent: Aug. 3, 2010

(54) THRESHOLD ADJUST SYSTEM AND METHOD

(75) Inventor: Afshin Momtaz, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 1176 days.

(21) Appl. No.: 11/128,905

(22) Filed: May 13, 2005

(65) Prior Publication Data

US 2006/0256892 A1 Nov. 16, 2006

(51) Int. Cl.
*H04L 25/06* (2006.01)

(52) U.S. Cl. .............. 375/317; 327/175; 348/672; 358/522; 382/168; 702/180

(58) Field of Classification Search .............. 375/317, 375/334, 345, 346, 355; 327/175; 398/39
See application file for complete search history.

(56) References Cited

U.S. PATENT DOCUMENTS

| | | | | |
|---|---|---|---|---|
| 5,987,075 A * | 11/1999 | Abe et al. | ............ | 375/334 |
| 6,128,353 A * | 10/2000 | Ho et al. | ............ | 375/345 |
| 6,472,918 B1 * | 10/2002 | Mosinskis et al. | ...... | 327/175 |
| 2004/0086276 A1 * | 5/2004 | Lenosky et al. | ...... | 398/39 |
| 2004/0146127 A1 * | 7/2004 | Kent et al. | ........... | 375/346 |

* cited by examiner

*Primary Examiner*—David C Payne
*Assistant Examiner*—Adolf Dsouza

(57) ABSTRACT

An adaptive algorithm is implemented that optimizes the slicer threshold by optimizing the tail distribution of a "+1" and "−1" histogram. Through the use of a low resolution and under-sampled ADC, a histogram of received bit may be created. The difference between the y-intersects of lines derived from the "+1" and "−1" histogram is used to determine an error function. The algorithm iteratively updates the threshold value based on this error function.

25 Claims, 11 Drawing Sheets

US 7,769,110 B2

THRESHOLD ADJUST SYSTEM AND METHOD

TECHNICAL FIELD

This application relates to data communications and, more specifically, to a system and method for adjusting a threshold associate with a signal in a communication system.

BACKGROUND

Conventional receivers for high speed serial communication systems may include a clock and data recovery circuit that extracts clock and data information from a received serial signal. For example, such a circuit may produce a clock signal synchronized with the incoming signal and the clock signal may then be used to recover data (e.g., data symbols) from the signal. Typically, the clock signal is generated at a frequency that matches the frequency of a data symbol rate in the received signal. The clock signal is then used to sample the received signal to recover individual data bits that correspond to each data symbol.

A clock and data recovery circuit may comprise a phase lock loop or delay lock loop that aligns the edges, for example the rising edges, of a generated clock signal with the transition edges (e.g., the edges of data symbols) of the received signal. As a result, the falling edges of the clock may be generated at times that coincide with approximately the middle of the data symbols. Thus, the falling edges of the clock signal may be used to sample the received signal in the middle of the data symbols.

To effectively extract the clock and data from the received signal, the receiver first makes a decision as to the value (e.g., "+1" or "−1," "0" or "1," etc.) represented by each bit of the received data. In a typical receiver that processes non-return-to-zero ("NRZ") data, the incoming NRZ data is passed through a slicer that determines whether the incoming bit is, for example, a "+1" or a "−1."

In some applications the slicer may make this determination based on a threshold associated with the signal. For example, the slicer may compare the incoming data with a threshold. Alternatively, the slicer may significantly amplify the signal to generate a signal that is more like a rail-to-rail signal. In this case, the slicer may thereby effectively cause the slicing decision to be made at or near the mid amplitude (e.g., ½ the signal swing) of the signal.

For a signal to be represented by a "+1" or a "−1," the portion of the signal that is higher than the associated threshold is output by the slicer as a "+1" and the portion of the signal that is lower than the associated threshold is output as a "−1." Typically, the value of the associated threshold is set to zero (half way between "+1" and "−1"). However, to improve the receiver performance the threshold may be made adjustable.

Some conventional receivers adjust threshold based on a bit error rate ("BER") analysis of the data recovered by the receiver. This process may involve, for example, sending known test data to the receiver and determining the resulting bit error rate. The threshold level may then be adjusted to provide a lower bit error rate, if possible. Such techniques, however, may require that the receiver include forward error correction ("FEC") circuitry or other relatively complex circuitry to calculate the bit error rate. In many applications, such additional circuitry may be undesirable. Hence, a need exists for improved techniques for determining an optimum value of a threshold associated with a signal.

SUMMARY

A system and/or method of adjusting a threshold associated with a signal in a system, substantially as shown in and/or described in connection with at least one of the figures, as set forth more completely in the claims.

BRIEF DESCRIPTION OF THE DRAWINGS

These and other features, aspects and advantages of the present invention will be more fully understood when considered with respect to the following detailed description, appended claims and accompanying drawings, wherein:

Figure 1:
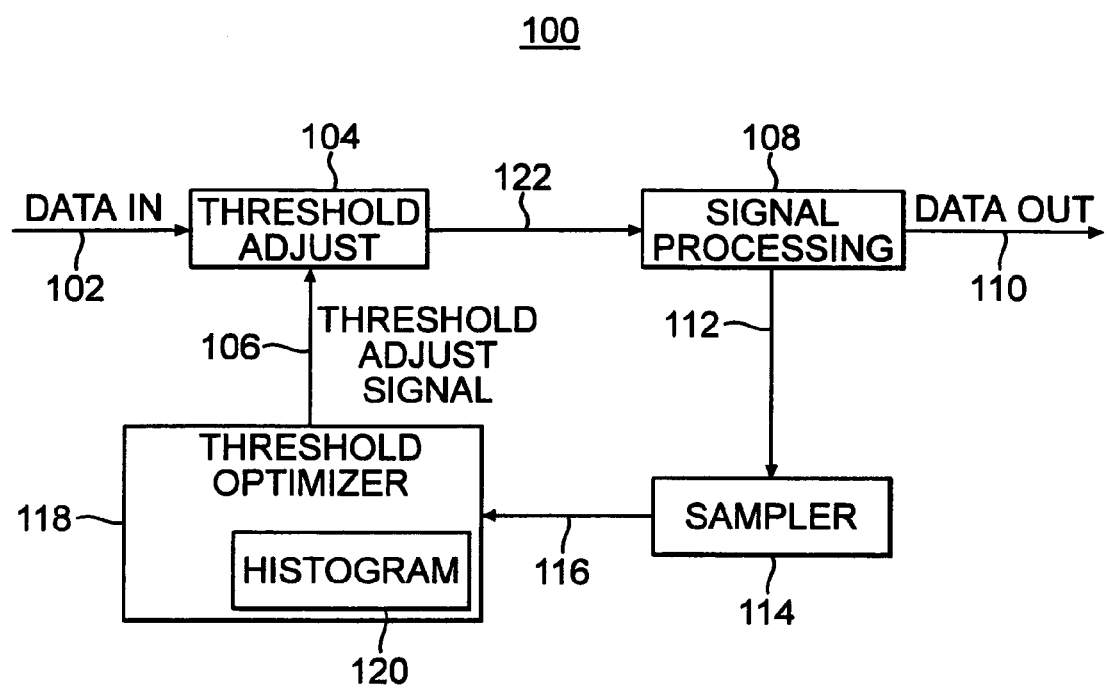
FIG. 1 is a simplified block diagram of one embodiment of a threshold adjust system constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention. For example, references to specific structures and processes in the disclosed embodiments should be understood to be but one example of structures and processes that may be used in these or other embodiments in accordance with the teachings provided herein. Accordingly, otherwise restrictive nomenclatures such as "is," "are," etc. should be understood to include less restrictive meanings such as "may be," etc. For convenience, an embodiment of a system constructed or a method practiced according to the invention may be referred to herein simply as an "embodiment."

FIG. 1 is a simplified block diagram of one embodiment of a threshold adjust system 100 constructed in accordance with the invention. The system 100 processes an input signal 102 based, in part, on a threshold associated with the input signal 102 to generate an output signal 110. To improve its performance, the system 100 may process the input signal 102 to determine an optimum value for the threshold. The system 100 may then adjust the threshold to this optimum value.

In some embodiments a threshold adjust circuit 104 may be used to adjust the threshold of a received signal 102 in accordance with the value of a threshold adjust signal 106. For example, the threshold adjust signal 106 may be added to the signal 102 to adjust a threshold (e.g., the DC level) of the signal 102. Alternatively, the threshold adjust signal 106 may be provided to a threshold input of a circuit (e.g., a comparator) that processes the signal 102.

After processing the received signal 102, threshold adjust circuit 104 provides the processed signal 122 to a signal processing component 108 that generates the desired output signal 110. For example, in a communications receiver, the signal processing component 108 may perform clock and data recovery operations that extract a sampling clock from the signal 122 and retime the signal 122 to provide the signal 110.

As mentioned above, the system 100 may process the received signal to determine an optimum threshold that may be used to further process the received signal. For example, the signal 122 or some signal derived from the signal 122 may be digitized so that the signal may be processed by a digital processing system. In the embodiment of FIG. 1, the signal 122 or some signal derived from signal 122 may be provided to a sampler 114 as a signal 112. The sampler may comprise, for example, an analog to digital converter, a sample-and-hold circuit, etc.

After the sampler 114 converts the signal 112 to a digital signal 116, the digital signal 116 is provided to a digital processing system (e.g., a threshold optimizer 118). The digital processing system may thus process the digital signal 116 to obtain information regarding the characteristics of the received signal 102.

In some embodiments the threshold optimizer 118 includes a data memory for storing at least a portion of the sampled data 116. For example, the threshold optimizer may generate a histogram 120 of the sampled data. In this case, the threshold optimizer 118 may process the histogram to, for example, determine an optimum value for the threshold adjust signal 106 and/or determine a direction and magnitude to adjust the threshold adjust signal 106 to converge the threshold toward the optimum value.

Accordingly, based on the characteristics of the received signal, the threshold optimizer 118 may generate a threshold adjust signal 106 that adjusts a threshold associated with the received signal 102. Consequently, the performance of the system may be improved without the need for FEC circuitry or similar circuits.

Figure 2:
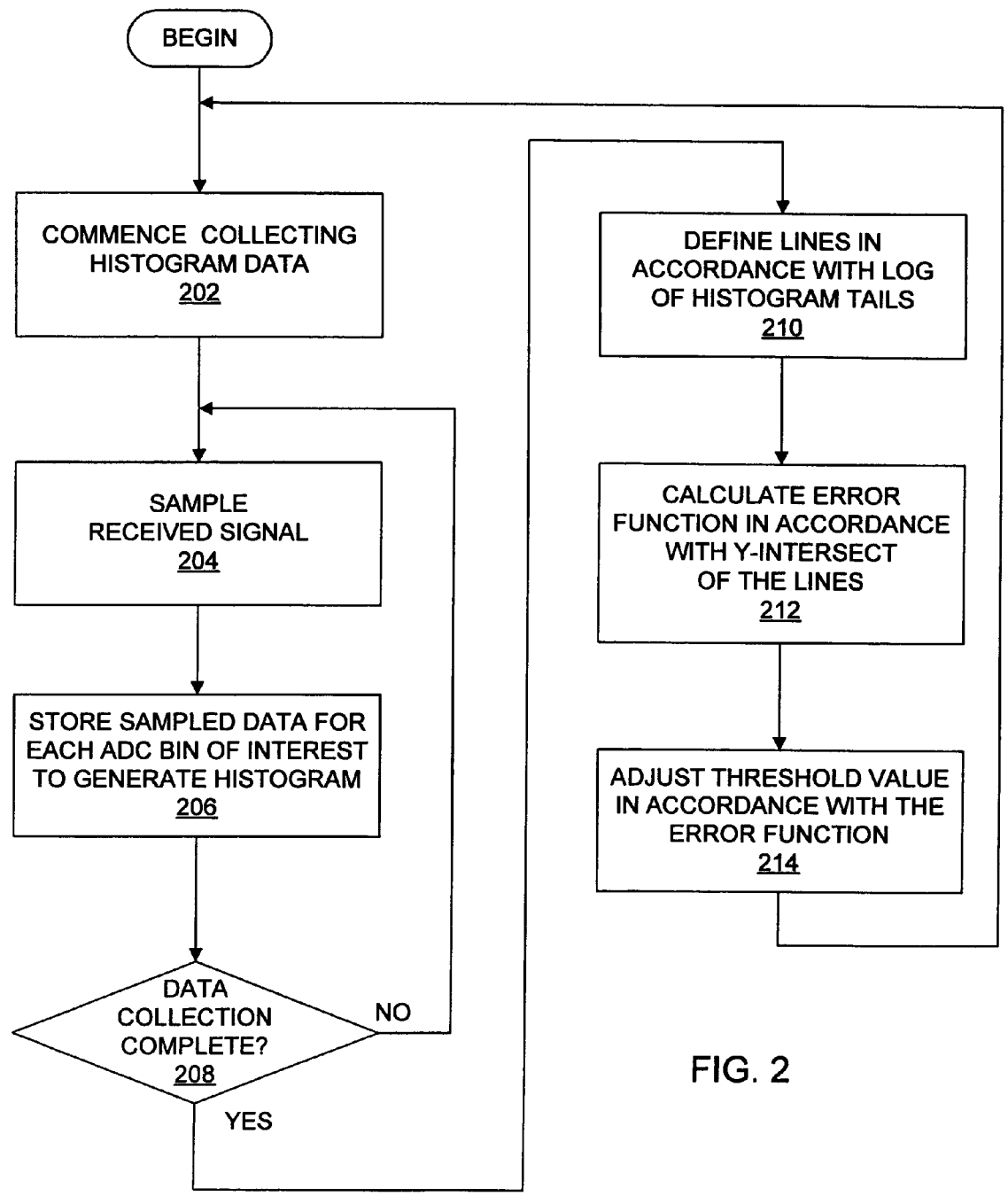
FIG. 2 is a flow chart of one embodiment of threshold adjust operations that may be performed in accordance with the invention.

One embodiment of operations that may be performed by a threshold adjust system such as the one depicted in FIG. 1 will be discussed in more detail in conjunction with FIG. 2. As represented by blocks 202-208, the system processes a received signal to generate a histogram associated with the signal. For example, the system may continually sample the received data (block 204) and store the sampled data in a data memory (block 206).

The data collection processes may be commenced at block 202 in a variety of ways. For example, a system may be configured to continually collect data or to collect data on a non-continuous basis. Examples of the latter may include invoking a data collection process periodically or randomly or based on a stimulus or other condition. Similarly, the processes of sampling the data (block 204) and/or storing the data (block 206) may be invoked on a continuous or non-continuous basis.

The process of block 204 may involve sampling the received data either before or after it has been processed in some way. For example, in some embodiments of a receiver the received data may be sampled after it has been equalized.

In some embodiments the sampler may under-sample a received signal. For example, in FIG. 1 the sampler 114 may sample the signal 112 in accordance with a clock signal (not shown in FIG. 1) that has a data rate that is a fraction of the rate of a sampling clock used to generate the signal 110. In this case, provisions may be made to ensure that the sampler 114 samples the signal 112 at appropriate points in time. For example, a delay lock loop or other circuitry may be used to synchronize the clock for the sampler 114 with the sampling clock.

In some embodiments the sampled data is stored as a histogram. For example, a bin may be associated with each value (e.g., 0-15) that the sampler may generate. A count in a bin is then incremented whenever the sampler generates a value that corresponds to that bin. As discussed in more detail below, the histogram information may be processed to, in effect, determine the characteristics of the eye of the signal. These characteristics, in turn, may be used to define an optimum threshold for slicing the signal.

In some embodiments only a subset of the bins may be of interest. For example, information relating to the eye of a signal may be obtained by processing only those bins at or near the middle of the histogram. In this case, only the information relating to the bins of interest may be stored and/or processed in some embodiments.

As represented by block 208, the data sampling and collection process continues until a sufficient amount of histogram data has been collected. Once the data collection process is complete, the histogram data is processed to determine a magnitude and a direction of any required threshold adjustment.

As discussed in more detail below, the histogram data is processed to extract information that may be used to generate an error function. For example, an optimum threshold level may be derived from an intersection of two lines that may be derived from the histogram data (block 210). Accordingly, identifying a current threshold error may, in some embodiments, involve extracting linear equation information from the tail distribution of the histogram "+1" and "−1" data.

As represented by block 212, the system may calculate the current threshold error (e.g., error function) based on the y-intersect of these lines. Here, the difference between the y-intersect of the lines may relate to the magnitude of a desired threshold adjustment.

As represented by block 214, the system may determine the optimum value for the threshold adjust signal based on the error function. Accordingly, the system may then adjust the threshold adjust signal to cause the threshold to incrementally converge to this optimum value.

Figure 3:
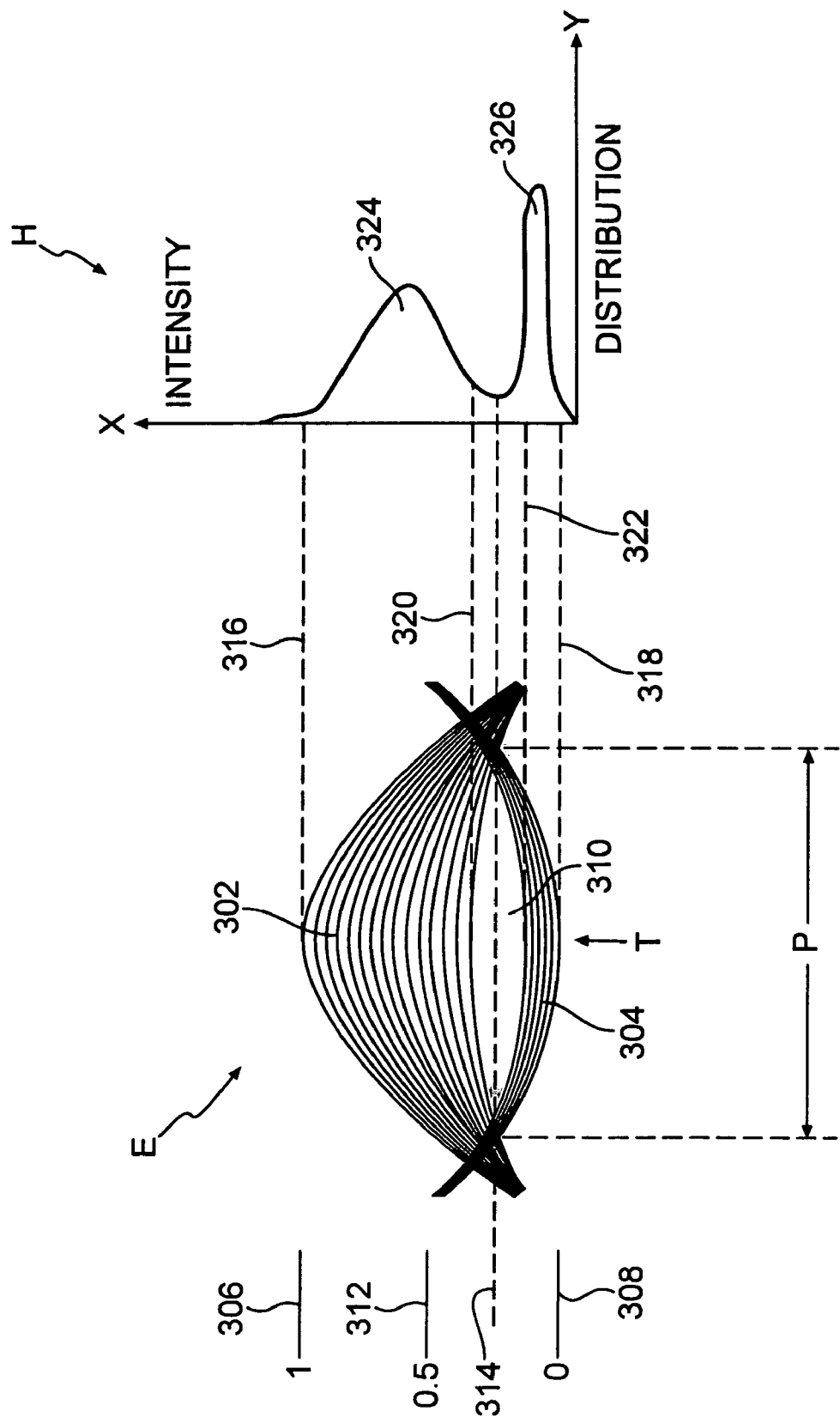
FIG. 3 is a simplified diagram illustrating an exemplary signal and an associated histogram.
Figure 4:
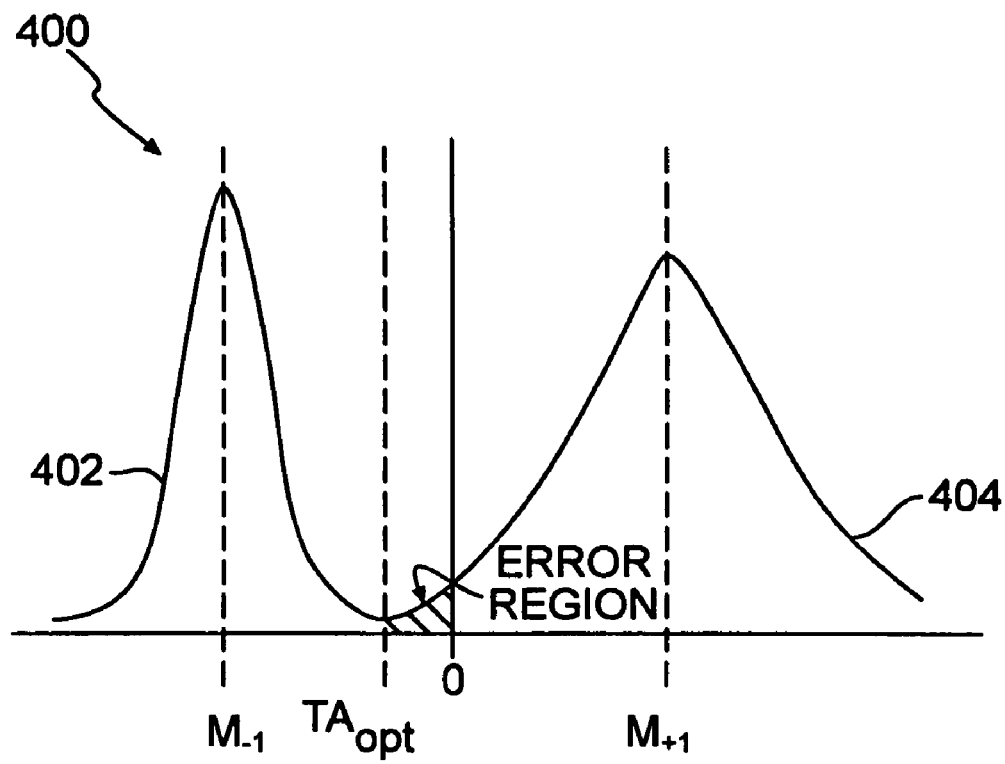
FIG. 4 is a simplified diagram illustrating an exemplary histogram associated with a signal.

Referring now to FIGS. 3 and 4, the histogram data and the error function will be treated in more detail. The left portion of FIG. 3 depicts one example of an eye diagram E of a signal. The right portion of FIG. 3 depicts one example of a histogram H that may be associated with the eye diagram E.

The eye diagram E is a time domain representation of a collection of successive traces of a received signal over one bit period P. The magnitude of the signal is represented by the upper and lower lines 306 and 308 on the leftmost side of the figure. In this case it is assumed that the amplitude of the signal ranges from a value of "0" (line 308) to a value of "1" (line 306). When the signal has a value that is designate a "1" the signal trace will fall generally within the upper portion 302 of the eye diagram E. Conversely, when the signal has a value that is designated a "0" the signal trace will fall generally within the lower portion 304 of the eye diagram E.

An eye opening 310 in the eye diagram represents signal amplitudes that generally are not produced by the signal at a given time in the bit period P. For example, a preferred time to sample the bit may be at time period T in the middle of the bit period P since there tends to be a relatively large difference between the "1"s and "0"s of the signal at that time.

In some applications the eye opening 310 may be shifted down from the center (along the x axis) of the eye diagram E as shown in FIG. 3. For example, in an optical channel signals are represented as "1"s and "0"s by modulating the intensity of a light source from high intensity (e.g., a "1") to low or no intensity (e.g., a "0"). In practice, however, some level of overshoot may be present in the signal for received "1"s. However, overshoot may not occur for received "0"s since the intensity may not go below zero. In other words, the signal spread of the area 302 (for "1"s) may be larger than the signal spread of the area 304 (for "0"s). As a result, the middle of the eye from a magnitude standpoint may not be at level 0.5 (line 310) but may, instead, be at a lower level as represented by dashed line 314.

It should be apparent from the eye diagram E that the preferred threshold level for distinguishing between a "0" and a "1" is the level represented by line 314. For example, if the threshold level was at 0.5 (line 312), some signals that are actually "1"s would fall below this threshold level. As a result, these signals may incorrectly be identified as "0"s.

To compensate for this shifted eye opening, it is desirable to either adjust a threshold (e.g., adjust the DC level) of the signal or adjust a threshold level (e.g., adjust a signal provided to a threshold input) of a circuit (e.g., a slicer) that determines whether the signal is currently a "0" or a "1." In the former case, a DC component may be added to the signal to, in effect, raise the eye opening of the signal upwards so that the middle (with respect to the x axis) of the eye is, for example, at the 0.5 level. In the latter case, the level of a threshold input signal for the slicer may be lowered so that the slicer outputs a "1" when a signal is above the level represented by the line 314 and outputs a "0" when a signal is below the level represented by the line 314.

The histogram H represents the signal distribution (rotated y axis) as a function of the intensity of the signal (rotated x axis) over a given period of time. In other words the histogram H depicts, for a given intensity value, the relative number of received signals that had that intensity value. Thus, the distribution is relatively high at area 324 and area 326 that respectively correspond to the "1" area 302 and the "0" area 304 of the eye pattern E. Conversely, the distribution is lower at the portions of the signal that correspond to an absence or low level of received signal intensity values. For example, the distribution is at or near zero above the dashed line 316 that corresponds to the upper limit of a "1" and below the dashed line 318 that corresponds to the lower limit of a "0."

The distribution also is relatively low in the portion of the histogram between the dashed lines 320 and 322 that correspond to the eye opening 310. Accordingly, the histogram H provides some information as to the location of the eye opening 310. This relationship will be discussed in more detail in conjunction with FIG. 4.

A histogram 400 shown FIG. 4 is similar to the one shown in FIG. 3 except that the y axis represents the distribution and the x axis represents the value of a received signal that varies from "−1" to "+1." The signal swing from "−1" to "+1" represents, for example, a differential electrical signal. Thus, the representation of a "0" in the optical domain of FIG. 3 is represented as a "−1" in the differential electrical domain of FIG. 4. The received signals corresponding to a "−1" form a bell-shaped curve 402 around a mean $M_{-1}$ while the received signals corresponding to a "+1" form a bell-shaped curve 404 around a mean $M_{+1}$.

In FIG. 4, a default slicer threshold is shown at a halfway point between $M_{-1}$ (the mean of the "−1"s) and $M_{+1}$ (the mean of the "+1"s) which corresponds to "0" value. As discussed above, however, the optimum threshold value is not at "0" but may instead be at the point $TA_{opt}$. Hence an error region may exist between the default slicer threshold and the optimum threshold value.

With the above overview in mind, one embodiment of a method of moving a slicer threshold or adjusting the DC level of the received signal to an optimum point (e.g., $TA_{opt}$) will be discussed in more detail in conjunction with FIGS. 4 and 5. The shape of the histogram close to the $TA_{opt}$ point is mainly determined by random noise as opposed to inter symbol interference ("ISI"). As a result, the histogram close to the $TA_{opt}$ point may be approximated by a Gaussian distribution. Hence, if the log values of the histogram tails (the regions close to the $TA_{opt}$ point) are plotted, two relatively linear lines (corresponding to the "+1" and "−1" tails) may be approximated. The "+1" tails and the "−1" are shown as the left and right solid lines, respectively, in FIG. 5. The intersection of the solid lines further illustrates that the optimum threshold value is not at zero but is instead slightly to the left of zero (e.g., near Δ/2).

Figure 5:
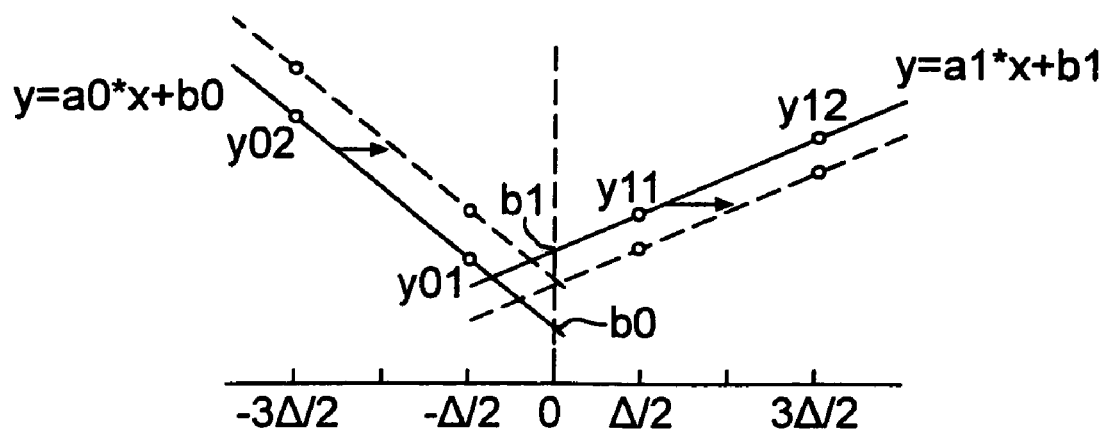
FIG. 5 depicts a simplified diagram illustrating interpretation of histogram data in accordance with the invention.

Optimum performance may be achieved if the incoming data is, in effect, shifted to the right (as represented by the arrows) to move the tails to the positions represented by the dashed lines in FIG. 5. In contrast with the solid lines, the dashed lines cross each other at "0" (the slicer default threshold). In other words, each of the dashed lines intersects with the y-axis at the same y value. The lines in FIG. 5 may be represented by the line equations shown next to the lines. Thus, the y-intersects of the left lines are defined as b0 and the y-intersects of the right lines are defined as b1. Accordingly, an error function (Err) may be defined as the difference between b1 and b0.

For convenience, the histogram 400 is shown as being defined by relatively smooth lines. In practice, however, the received signal may be digitized using an analog to digital converter. In this case, a histogram of the received data may be created by binning the outputs of the analog to digital converter.

A histogram that results from a digital sampling of the received signal may take the form of a stair-stepped representation that approximates the shape of the bell-shaped curves in FIG. 4. Here, the relative magnitude between successive steps depends, in part, on the number of bits that are used to represent the magnitude of the signal from "−1" to "+1."

Relative ratios of the log of the digital data from four bins in the histogram are represented in FIG. 5 by the points y02, y01, y11 and y12. For example, the heights of these points may represent the respective ratios of the log of the number of hits stored in each of the four bins. Using two data points per line, b1 and b0 may be calculated as follows:

$$b0 = (3*y01 - y02)/2 \quad \text{EQUATION 1}$$

$$b1 = (3*y11 - y12)/2 \quad \text{EQUATION 2}$$

Where yij=log of the histogram at different ADC codes.

The error function Err may thus be calculated as follows (multiplying by two to simplify the equation):

$$\text{Err} = 2*(b1-b0) = (3*y11-y12)-(3*y01-y02) \quad \text{EQUATION 3}$$

Equation 3 may alternatively be written as:

$$\text{Err} = \text{Log}\,[(h11/h01)^3 *(h02/h12)] \quad \text{EQUATION 4}$$

Where hij=the histogram at different ADC codes.

Once Err is zero, the threshold is at the optimum point. Accordingly, Err may be used in an update function to iteratively update the threshold value to move it toward zero or near zero:

$$TA(n) = TA(n-1) + \text{mu} * \text{Err} \quad \text{EQUATION 5}$$

In Equation 5 mu is a weighting factor that may be set to provide an appropriate response time for the error function. For example, mu should not be set too low otherwise the update function may take a relatively long time to adjust the threshold. Conversely, if mu is set too high the value of the threshold may oscillate. In some application the value for mu may be selected based on simulations of the system operating parameters or based on other criteria.

From the above, it should be appreciated that only four of the ADC bins (levels) may be required to calculate b1 and b0 and hence Err. In some embodiments these four levels correspond to the four middle levels of the ADC. FIG. 5 depicts four middle levels spaced at Δ intervals that correspond to the least significant bit ("LSB") value of the ADC.

In some embodiments where a four bit ADC is used to sample the received data, the four bins represented in FIG. 5 may comprise bins 7, 8, 9 and 10. This selection of bins may be better understood with reference to FIG. 4. With a four bit ADC, sixteen different sample values (bins) are defined along the x axis. In addition, in a typical system $TA_{opt}$ will always be located between approximately the "0" point and a point that lies to the left of "0" but not significantly to the left of "0." Accordingly, in this example $TA_{opt}$ may only occur near bins 7, 8, 9 and 10 (counting from 0 to 15 from right to left).

Since this algorithm may only use the middle four levels of the ADC, in embodiments where a four bit ADC is not needed for other purposes in the system, the algorithm may be implemented using 4 comparators (2-bit ADC). Furthermore, in some embodiments the ADC may only be used for adaptation of the threshold value and it is not in the data path. As a result, the ADC may be operated at a relatively low speed compared to the received data rate. This, is turn, may advantageously reduce the power requirements for the ADC.

The error function Err may not be valid for all possible combinations of the bins values. Thus, in some cases Err may be set to, for example, 1/mu or −1/mu. These cases will be discussed in more detail in conjunction with FIGS. 6A, 6B, 6C and 6D. In these figures, the points defining the lines are referenced to their respective bin numbers. Hence, for convenience, the points may be referred to as bins in the discussion that follows.

Figure 6A:
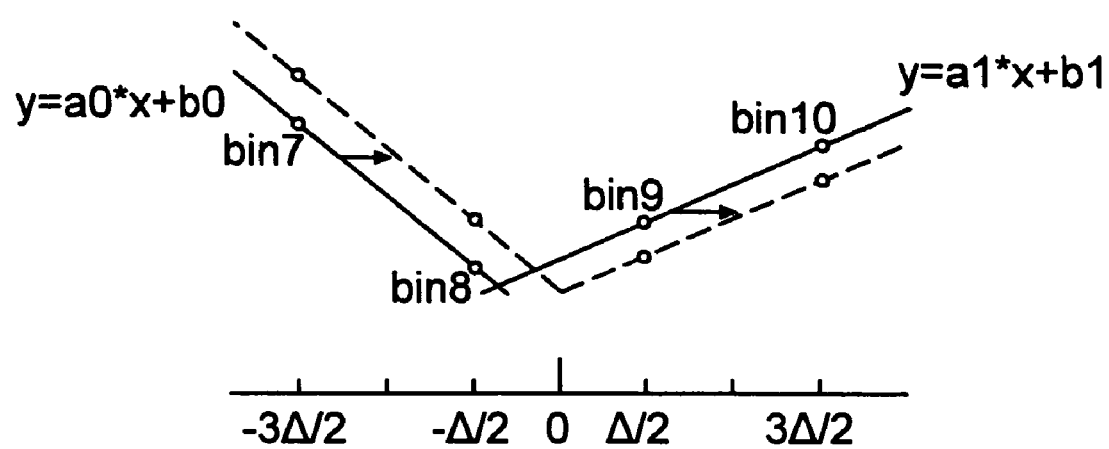
FIG. 6, consisting of FIGS. 6A, 6B, 6C and 6D, depicts simplified diagrams illustrating interpretation of histogram data in accordance with the invention.

FIG. 6A depicts a case (case 1) where bin 7>bin 8 and bin 10>bin 9. In addition, bins 7 and 8 are associated with the histogram of "−1" and bins 9 and 10 are associated with the histogram of "+1." In this case, the error function is defined as in Equation 3.

Figure 6B:
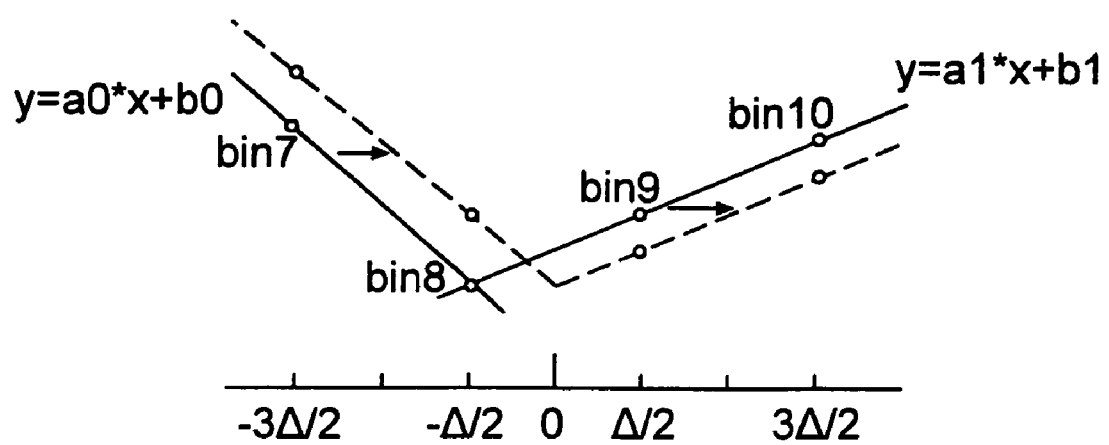

FIG. 6B depicts a case (case 2) where bin 7>bin 8 and bin 10>bin 9. However, only bin 7 is associated with the histogram of "−1." Thus, bins 8, 9 and 10 are associated with the histogram of "+1." In this case the true slope of the line passing through bin 7 will be steeper than the assumed line through bins 7 and 8. Accordingly, Equation 3 will calculate the wrong value for the slope of the line through bin 7 and for b0 (the true value of b0 will be lower). Nevertheless, the Err calculated by Equation 3 will have the correct sign since it will calculate that b0 is below b1. As a result, the update algorithm may still move the threshold in the correct direction. Moreover, as the threshold is moved, bin 8 will eventually comprise a portion of the histogram for "−1." Thus, case 2 will eventually turn into case 1. In view of the above, the error function for case 2 may be defined as in Equation 3.

Figure 6C:
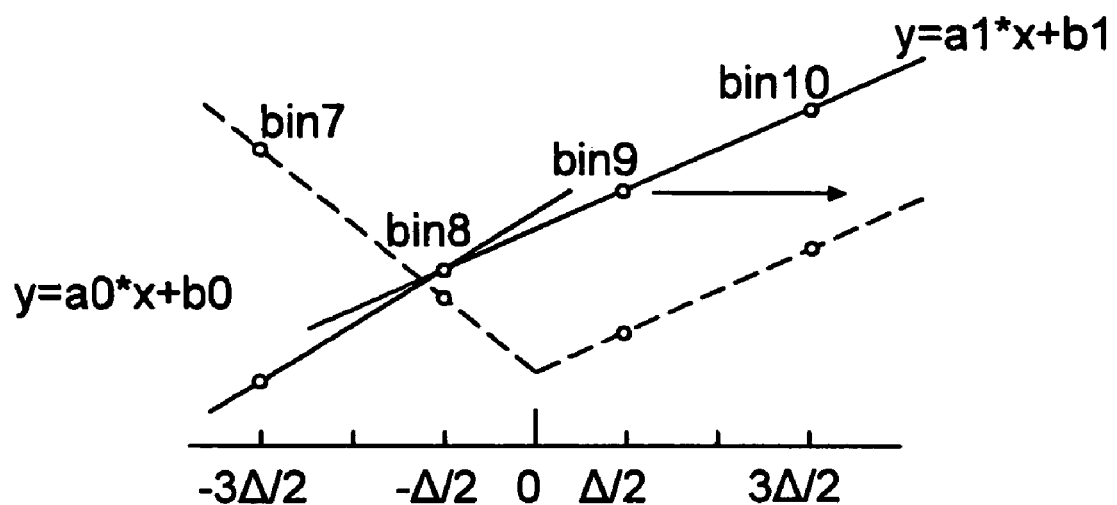

FIG. 6C depicts a case (case 3) where bin 7<bin 8 and bin 10>bin 9. Here, only bin 7 is associated with the histogram of "−1." Thus, bins 8, 9 and 10 are associated with the histogram of "+1." In this case the true slope of the line passing through bin 7 will be negative while the equation will calculate that the slope is positive (since the equation is based on the assumption that the line passes through bins 7 and 8) as shown in FIG. 6C. Accordingly, Equation 3 will calculate the wrong value for the slope of the line through bin 7 and for b0 (the true value of b0 will be below b1). Moreover, the Err calculated by Equation 3 will not have the correct sign since it will calculate that b1 is below b0. As a result, the update algorithm may move the threshold in the wrong direction.

The algorithm for calculating Err is therefore modified to set Err to 1/mu when bin 7<bin 8 and bin 10>bin 9. By setting Err to 1/mu the update function in Equation 5 will shift the new threshold TA(n) by 1 in the correct direction. As the threshold is moved, bin 7 will eventually become greater than bin 8. Thus, case 3 will eventually turn into case 2.

Figure 6D:
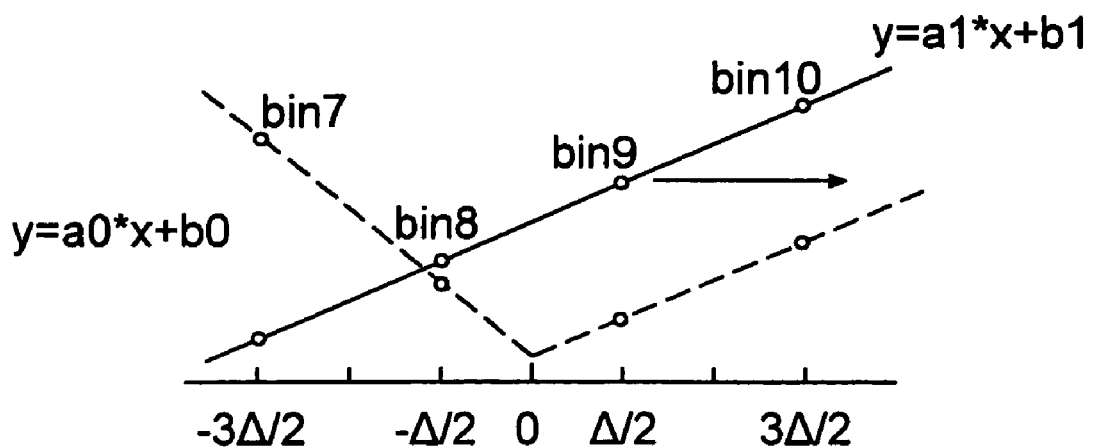

FIG. 6D depicts a case (case 4) where bin 7<bin 8 and bin 10>bin 9. However, bins 7, 8, 9 and 10 are all associated with the histogram of "+1." Accordingly, the algorithm for calculating Err also is modified to set Err to 1/mu when bin 7<bin 8 and bin 10>bin 9. This is similar to case 3. The update function in Equation 5 will therefore shift the new threshold TA(n) by 1 in the correct direction and bin 7 will eventually become associated with the histogram of "−1." Thus, case 4 will eventually turn into case 3.

A similar modification of the error function may be made to account for the cases where bin 10<bin 9. In these cases Err may be set to −1/mu.

Provisions also may be made to account for a case where the two middle bins are zero (no hits). This case may occur, for example, when the eye opening of the signal is relatively tall. In this case, the error function may use the next two outer bins for the linear equations. For example, instead of using bins 7, 8, 9 and 10 the error function may use bins 6, 7, 10 and 11.

A threshold adjust system as described herein may be used in a variety of applications. For example, in some embodiments a threshold adaptation loop is incorporated into a receive equalizer. The equalizer may include a slicer that literally or effectively compares the received signal with a threshold signal. The receiver also may include an analog to digital converter for generating sampled signals that are used in the adaptation paths of the receiver. Here, a slower clock may be used to clock the analog to digital converter.

Figure 7:
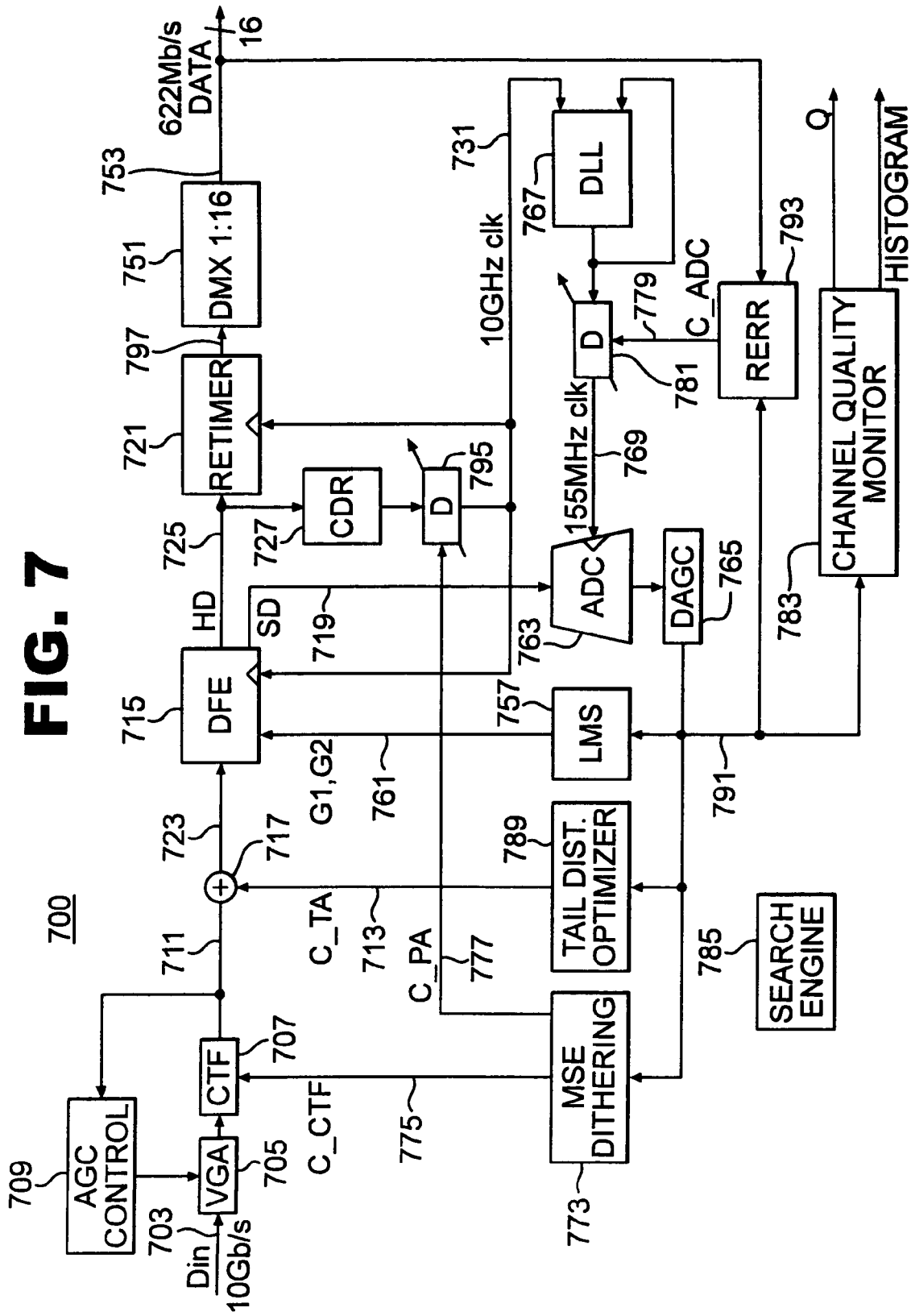
FIG. 7 is a simplified block diagram of one embodiment of a data communication receiver constructed in accordance with the invention.

FIG. 7 is a simplified diagram of one embodiment of a communication receiver 700 that incorporates a threshold adjust circuit. In this embodiment, the threshold adjust circuit adjusts a threshold associated with operations that slice a received signal.

In an exemplary embodiment, the receiver 700 recovers data from a 10 Gbits per second ("Gbps") serial data signal received from, for example, an optical channel. The receiver employs an adjustable continuous time filter ("CTF") and a decision feedback equalizer ("DFE") to reduce errors in the data recovered from the received signal. The receiver 700 also includes a clock recovery circuit and an analog to digital converter ("ADC") clock circuit, both of which include mechanisms for adjusting the phase of the generated clock. It should be appreciated, however, that the compensation techniques described herein are equally applicable to other applications including other receiver types, architectures, data rates and control loops.

Upon receiving an input data signal 703, the receiver 700 initially amplifies and filters the signal 703. A variable gain amplifier ("VGA") 705 amplifies the input data signal 703 and provides the amplified data signal to a continuous time filter 707. The continuous time filter 707 filters the data signal using, for example, a low pass filter that has an adjustable bandwidth. In the embodiment of FIG. 7, a dithering algorithm circuit 773 provides a bandwidth adjust signal ("IC_CTF") 775 to control the bandwidth of the continuous time filter 707. By adjusting this bandwidth via the control signal 775, the dithering algorithm circuit 773 may reduce the mean square error ("MSE") of a signal recovered (e.g., signal 797 discussed below) from the received signal 703.

An example of a continuous time filter having an adjustable bandwidth is disclosed in U.S. patent application Ser. No. 10/774,724, filed Feb. 9, 2004, the disclosure of which is hereby incorporated by reference herein. An example of a variable gain amplifier and a continuous time filter is disclosed in commonly owned U.S. patent application Ser. No. 10/841,766, filed May 7, 2004, the disclosure of which is hereby incorporated by reference herein.

A filtered data signal 711 from the continuous time filter 707 is provided to an automatic gain control ("AGC") circuit 709. Under the control of the automatic gain control circuit 709 the variable gain amplifier 705 may appropriately amplify or attenuate small or large amplitude input signals, respectively, to generate an output signal having relatively constant amplitude.

In some embodiments an adder 717 combines the data signal 711 from the continuous time filter 707 with a threshold adjust signal ("C_TA") 713 from a tail distribution optimizer 789. In this way the threshold optimizer 789 as described herein may, for example, adjust the DC level of the signal 711. In other words, the histogram is moved while the threshold of a slicer that slices the signal 723 may be kept at, for example, "0." In this way, the threshold associated with the resultant signal 723 may be more closely matched with the threshold of the slicer. As a result, the slicing decision may be made at a level that is at or near the optimum level.

The resultant combined signal 723 is then provided to a decision feedback equalizer 715 and a clock and data recovery circuit ("CDR") 727. The decision feedback equalizer 715 combines the data signal 723 with equalized feedback signals (not shown in FIG. 7) that may be scaled by one or more equalizer coefficient signals 761 to generate a soft decision data signal 719. A hard decision data signal 725 or a binary data signal is also generated by, for example, a slicer (not shown in FIG. 7) that slices the soft decision signal. In this embodiment, the binary signal 725 is retimed by a retimer 721 to generate a data signal 797 that constitutes equalized data that has been recovered from the incoming data signal 703.

The clock and data recovery circuit 727 extracts a 10 GHz clock signal 731 (in this 10 Gbps receiver example) from the binary data signal 725 by, for example, aligning the rising edge of the extracted clock 731 with transitions in the binary signal 725. In this way, the clock and data recovery circuit 727 may maintain a desired timing relationship between the binary data signal 725 and the clock signal 731 that the retimer 721 uses to retime the binary data signal 725.

The clock and data recovery circuit 727 incorporates a phase adjust circuit 795 that may be used to, for example, make relatively small adjustments in the phase of the clock signal 731. In one embodiment, the phase adjuster 795 is controlled by a control signal ("C_PA") 777 to adjust the phase of the clock 731. For example, the control signal 777 may create an offset in the detected phase relationship between the clock signal 731 generated by the CDR 727 and the binary data signal 725. By adjusting this delay via the control signal 777, the dithering algorithm circuit 773 may further reduce the mean square error of the signal recovered (e.g., signal 797) from the received signal. Examples of decision feedback equalizers with adjustable delay are disclosed in U.S. patent application Ser. No. 10/774,725, filed Feb. 9, 2004, the disclosure of which is hereby incorporated by reference herein.

In some embodiments, a demultiplexer ("DMX") 751 demultiplexes the recovered data signal 797 to generate parallel data signals that are clocked at a slower rate. For example, in FIG. 7 the demultiplexer 751 generates sixteen parallel data signals 753 at a rate of 622 Mbits per second ("Mbps").

In some embodiments, the decision feedback equalizer 715 has an internal feedback loop (not shown in FIG. 7). The internal feedback signals are multiplied by (in this two-tap equalizer example) equalization coefficients G1 and G2 (typically negative numbers) provided by signals 761. The resulting scaled equalized feedback signals are added by an internal summer (not shown in FIG. 7) to the data signal 723. Thus, the decision feedback equalizer 715 may subtract a scaled version of one or more previous symbols from a current (that is, current in time) symbol to reduce or eliminate channel induced distortion such as inter-symbol interference.

In general, the values of the equalization coefficients G1 and G2 depend on the level of inter-symbol interference that is present in the incoming data. Typically the absolute value of an equalization coefficient increases with increasing inter-symbol interference. In some embodiments, a least mean square ("LMS") algorithm circuit 757 calculates an error associated with an equalized signal (e.g., the soft decision signal 719) and adjusts the values of the equalization coefficients G1 and G2 in accordance with the error.

As mentioned above, an error signal for the adaptation paths may be obtained by processing a digitized version of the soft decision signal 719. In FIG. 7, an analog to digital converter 763 samples the soft decision signal 719 to generate digital signals that are provided to a digital automatic gain control circuit ("DAGC") 765. The digital output signal 791 of the digital automatic gain control circuit 765 is then used by the adaptations loops as discussed herein.

In some embodiments, the analog to digital converter 763 samples the soft decision signal 719 using a 155 MHz clock signal 769 generated by a delay lock loop ("DLL") 767. The relative phase of the clock signal 769 determines the point in time in a given symbol of the signal 719 at which the analog to digital converter 763 samples the symbol.

In some embodiments, the delay lock loop 767 works in conjunction with a delay circuit 781 that may be used to control the phase delay of the clock signal 769. The relative error circuit 793 may adjust a delay value signal 779 to vary the point at which the analog to digital converter 763 samples symbols from the soft decision signal 719. In this way the analog to digital converter 763 may be controlled to sample at approximately the same point in time as the retimer 721. The relative error circuit 793 adjusts the correction signal 779 based on at least a portion of output signal 753 and the DAGC output signal 791. For example, the signal 763 may be adjusted to a level the results in a reduction in the number of errors calculated from comparisons of the data bits from signal 753 that correspond to data bits from the signal 791.

In some embodiments the DAGC output signal 791 is used in several adaptation loops in the receiver 700. As discussed above, the dithering algorithm circuit 773 generates several signals to control the operations of various components in the receiver 700. The bandwidth adjust signal 775 controls the bandwidth of the continuous time filter 707. The phase adjust signal 777 adjusts the phase of a signal 731 generated by the clock and data recovery circuit 727 via the phase adjust circuit 795. In addition, the phase adjusted clock signal 731 affects the timing of the clock 769 generated by the delay lock loop 767 for the analog to digital converter 763. In other embodiments, the dithering algorithm may control any number of coefficients, values, loops or other parameters. The adaptation processes may be used for multiple purposes including determining coefficients for a continuous time filter, a phase adjust circuit, threshold adjustment loop, a decision feedback equalizer or similar purposes.

In some embodiments, the dithering algorithm circuit 773 modifies the signals 775 and 777 according to a mean square error associated with a received data signal. In FIG. 7, the mean square error is calculated from the soft decision signal 719 generated by the decision feedback equalizer 715. The dithering algorithm circuit 773 may reduce MSE by measuring MSE, then adjusting one or more of the signals 775 and 777, then re-measuring the MSE to compare the new MSE with the prior MSE. If the MSE decreased, the circuit 773 continues to adjust the signals in the same direction (e.g., up or down) as before. If the MSE increased, the circuit 773 adjusts the signals in the opposite direction.

The signal 791 also may be used by adaptation processes such as an ADC clock delay adaptation loop and a threshold adjustment loop as discussed herein. Moreover, it should be appreciated that the signal 791 may be used in other adaptation loops and that the above or other adaptations loops may use one or more other signals as a basis for adjusting control signals (e.g., coefficients) for the loops.

In some embodiments, the components 757, 765, 773, 789 and 793 are implemented in the digital domain. Other components such as a search engine 785 that generates initial coefficient values for the adaptation loops and a channel quality monitor 783 also may be implemented in the digital domain. Accordingly, these components may be implemented, for example, as microcode for microprocessors, programmable logical grid arrays, as a state machine, a processor with associated software or similar structures and devices.

Figure 8:
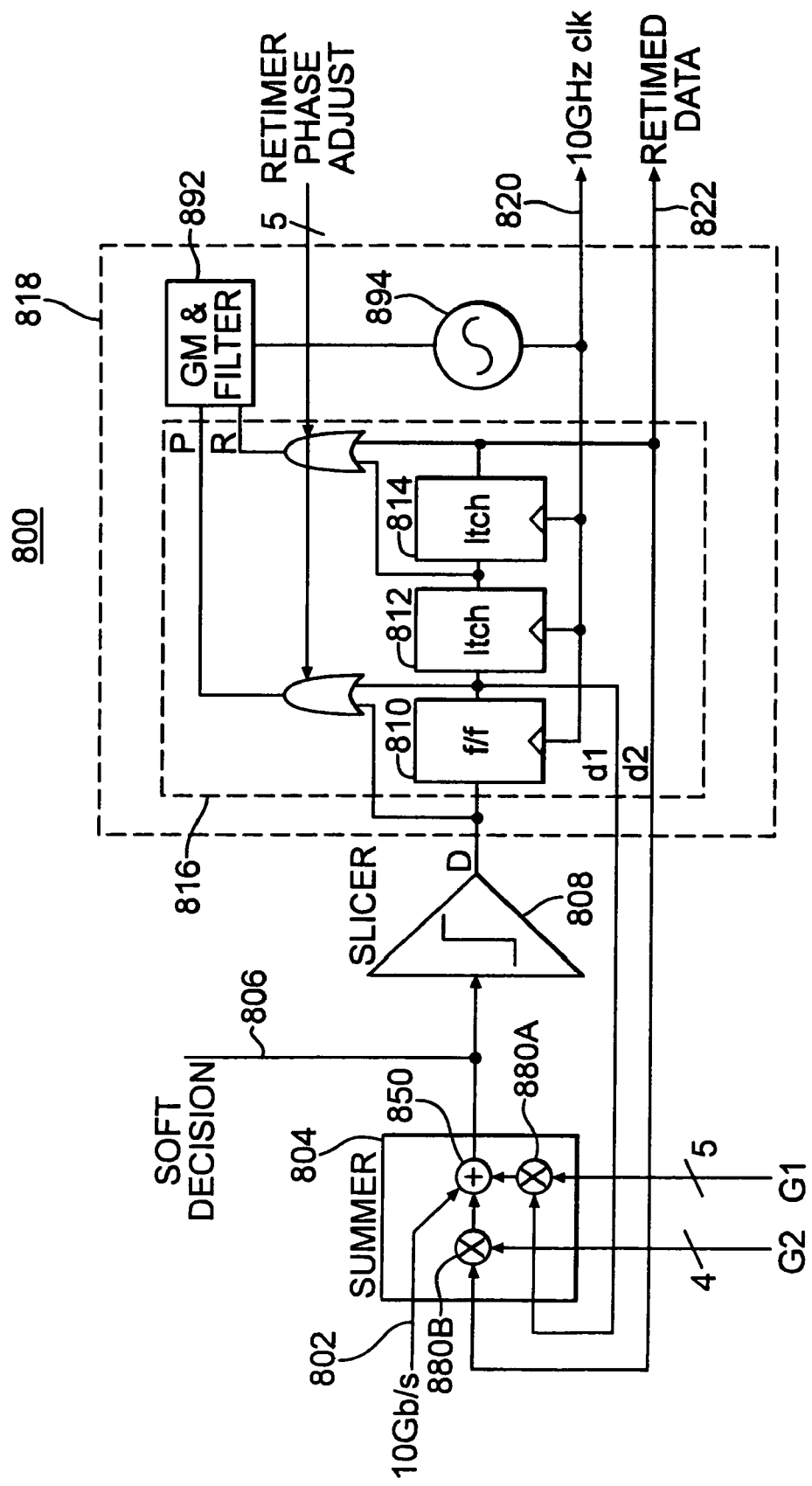
FIG. 8 is a simplified block diagram of one embodiment of a decision feedback equalizer and clock and data recovery circuit.

As discussed above, the threshold optimizer processes the soft decision signal to generate a threshold signal used for slicing operations. FIG. 8 illustrates in more detail one embodiment of a two tap decision feedback equalizer and clock and data recovery circuit 800 that may be used to generate the soft decision signal and that includes a slicer.

The embodiment of FIG. 8 equalizes received data before it is retimed and incorporates an integrated phase detector and retimer. For example, an input signal 802 is equalized at a summer 804 that adds equalizer feedback signals d1 and d2 (as scaled by coefficients G1 and G2) to the input signal 802. The resultant soft decision signal 806 is provided to a slicer 808 and the output (D) of the slicer 808 is provided to a clock and data recovery circuit (represented by the components within dashed box 818) that extracts a clock signal 820 and retimes the received data to generate an output signal 822. By equalizing and retiming data in this manner, signal delay problems and clock recovery problems resulting from ISI that exist in conventional devices may be avoided. Accordingly, this architecture may facilitate operation at higher data rates and may operate more effectively in systems with relatively high ISI.

The phase detector comprises the components within dashed box 816. Here, it may be seen that latches in the phase detector are used to generate the retimed data 822. Specifically, the CDR phase detector flip-flops (flip-flop 810 and latch pair 812 and 814) also function as DFE retimers. These flip-flops may be shared because in the architecture of FIG. 8 the flip-flops for a CDR phase detector may operate from the same signals (e.g., binary data signal (D) and an extracted clock signal 820) as the flip-flops for a DFE retimer. By integrating these phase detector and retimer components this architecture serves to advantageously reduce the number of high-speed components in the receiver.

The data outputs signals from the two flip-flops also provide the d1 and d2 DFE tap signals for the DFE feedback loop. As discussed above, the output signals d1 and d2 are multiplied by equalization coefficients G1 and G2 at multipliers 880A and 880B, respectively, and provided to an adder 850. The adder 850 then combines the equalization signals with the input signal 402.

As discussed above a slicer 808 may digitize the output 806 of the summer 804 by either literally or in effect comparing the output signal 806 with a threshold signal. The output of the slicer is binary data signal (D) that is provided to the first flip-flop 810. In this embodiment, the output of the second flip-flop provides the recovered data signal 822.

Outputs P and R from the phase detector 816 are provided to a charge pump and loop filter 892 which provides a voltage signal to a voltage controlled oscillator ("VCO") 894. The VCO 894 generates the extracted clock signal 820 that clocks the two flip-flops.

In some embodiments the soft decision signal 806 is used to generate error data for the adaptation loops. For example, the signal 806 may comprise the signal 719 described above in conjunction with FIG. 7.

Figure 9:
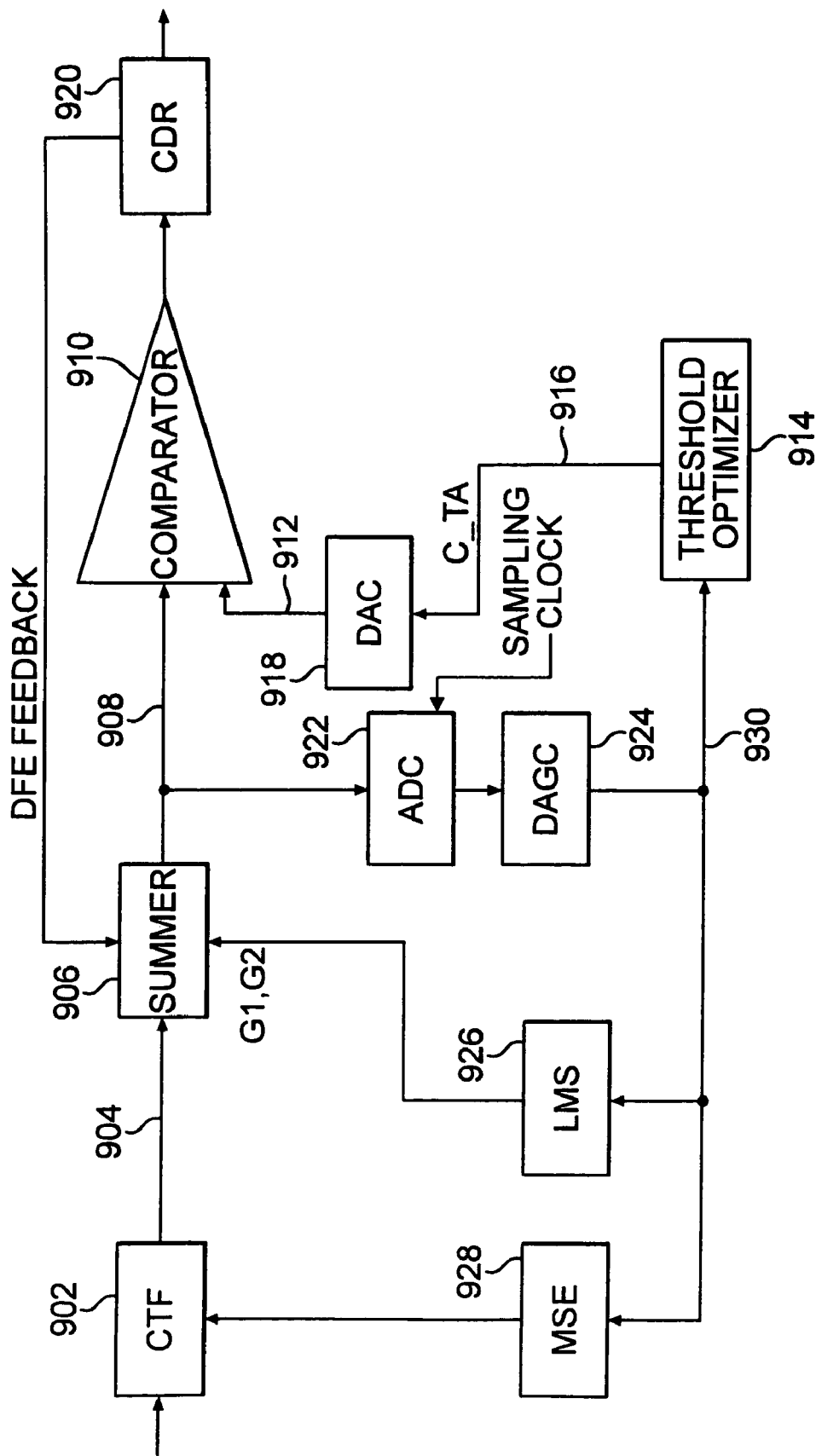
FIG. 9 is a simplified block diagram of one embodiment of a slicer threshold circuit.

Referring to FIG. 9, in some applications instead of shifting incoming data by a DC value, the slicer threshold may be adjusted by the threshold adaptation loop described herein. This adjustment may produce a similar effect as shifting the incoming data with an exception that the system of FIG. 9 provides an open-loop threshold adjustment rather than a closed loop threshold adjustment.

FIG. 9 illustrates one embodiment of a slicer with an adjustable threshold and a portion of the components in a receiver such as the receiver of FIG. 7. In FIG. 9, however, a summer is not provided after the CTF 902. Instead, the output 904 from the CTF 902 is fed directly into a summer 906 of a decision feedback equalizer.

A soft decision signal 908 from the summer 906 is provided to a slicing circuit that has an adjustable threshold. For example, the slicing circuit may include a comparator 910 that compares the signal 908 to a threshold signal 912.

To control the threshold, a threshold optimizer 914 generates a threshold adjust signal 916 that controls a digital to analog converter ("DAC") 918. The DAC 918, in turn, generates the threshold signal 912 that is provided to the comparator 910. The output of the slicing circuit may then be provided to a CDR 920.

As discussed above, the threshold optimizer 914 may receive a digitized soft decision signal 930 to generate a histogram. Here, an ADC 922 samples the soft decision signal 908 in accordance with a sampling clock. The output of the ADC 922 may be provided to a DAGC 924. The digital output 930 of the DAGC 924 is then provided to the threshold optimizer 914.

In the data path of the embodiment of FIG. 9, the threshold adjustment is made after the signal sampling that provides the error information for the threshold optimizer 914. As a result, an adjustment of the threshold adjust signal may not change the error function subsequently generated by the threshold optimizer 914. In other words this embodiment is an open loop system. Accordingly, provisions may be made to ensure that the threshold adjust signal adjust in an appropriate manner. For example, the adjustment process may involve changing the threshold by a value corresponding to the entire measured difference between b1 and b0. However, this adjust may only be made one time.

By basing its error function on the tail distribution, the operation of the threshold adjustment loop may be independent or substantially independent of the operation of other adaptation loops that are based on similar sampled data (e.g., signal 930). FIG. 9 shows that the digital output 930 of the DAGC 924 may be provided to, for example, an LMS adaptation loop 926 for a DFE and an MSE adaptation loop 928 for the CTF 902. However, in receivers that have an equalizer in the receive path as shown FIGS. 7 and 9, the operation of the threshold adjustment loop may be independent of the equalizer. This is possible because the adaptation algorithm for the equalizer typically minimizes the sum square error (e.g., an LMS algorithm) which is a function of the entire received histogram and not just the tail. Accordingly, using the tail distribution for the threshold adjustment may make the two loops more independent. As a result, an improvement in the stability of the system may be achieved.

Figure 10:
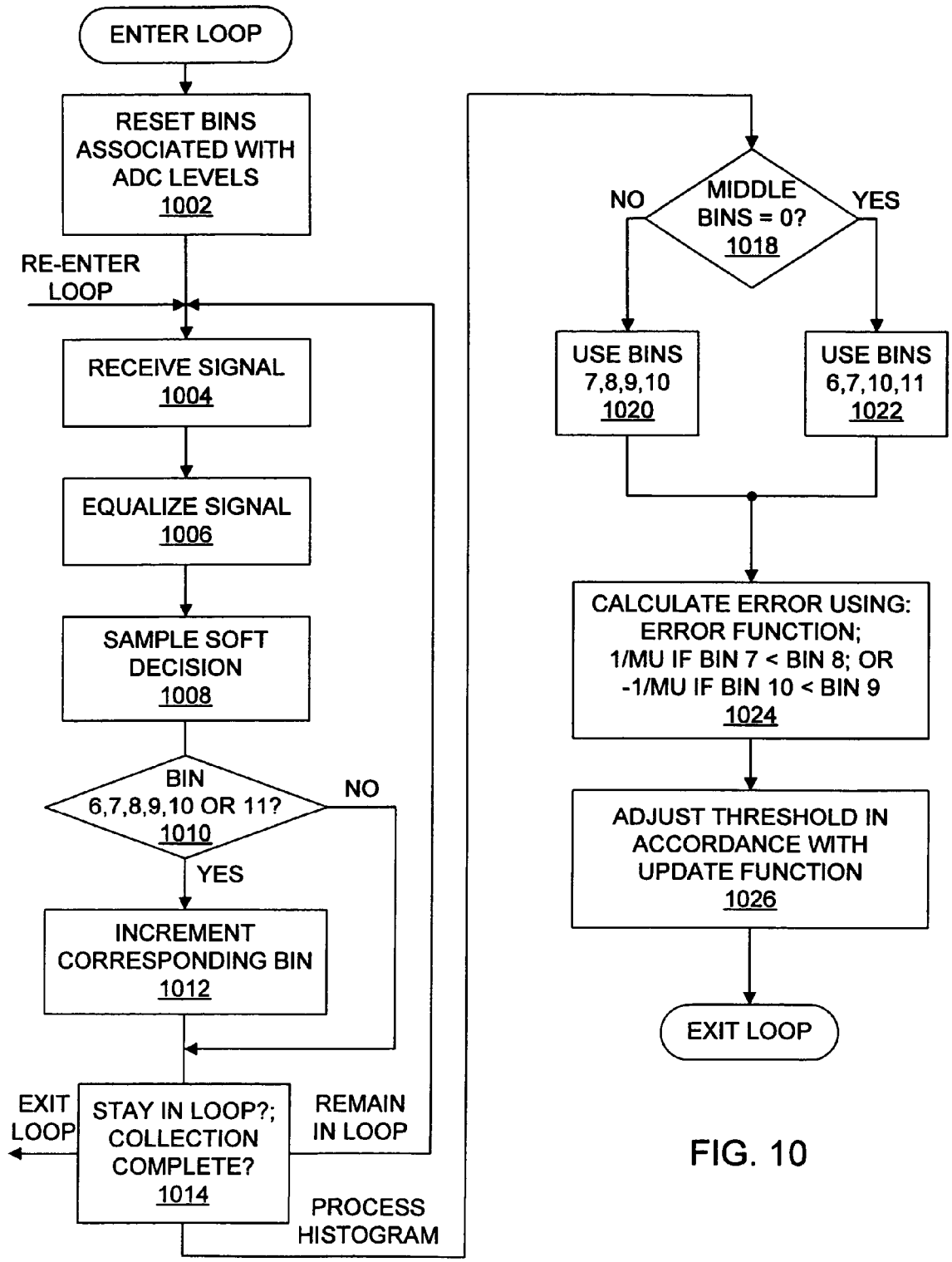
FIG. 10 is a flow chart of one embodiment of threshold adjust operations that may be performed in accordance with the invention.

Referring now to FIG. 10 one embodiment of operations that may be performed by a threshold adjust optimizer in a receiver will be described. Initially, the threshold optimization loop is entered. As discussed above, the loop may be entered on a periodic or other basis. For example, the loop may be invoked with sufficient frequency such that the loop may efficiently adapt to any changes in the threshold associated with the data. Provisions may be made, however, to ensure that priority is given to other adaptation loops that may be running in the system such as a DFE adaptation loop or a CTF adaptation loop.

As represented by block 1002, when the threshold adaptation loop is first invoked the histogram data may be cleared. Here, data memory bins such as registers, accumulators, etc., may be provided to store a hit count associated with each ADC level. Thus, at block 1002 each of the bins that hold data associated with a given ADC level may be cleared.

In some embodiments, a single histogram collection process may be invoked intermittently (or periodically, etc.) over a period of time. This may be done because it may be desirable to collect a relative large amount of data. By breaking the process up in this manner, any adverse impact on the performance of other components in the system may be avoided.

Accordingly, as represented by the re-enter loop line, the process may re-enter the loop at this point to continue collecting histogram data. In this case, the bins may already contain data.

As represented by blocks 1004-1008 the receiver receives an input signal and, in some embodiments, equalizes the received data to provide a soft decision signal for sampling. It should be appreciated, however, that the teachings of the invention are not limited to systems that provide a soft decision signal. For example, a signal that has not been equalized may serve as the basis for making a threshold adjustment. As noted above, the ADC may advantageously sample at a rate that is slower than the data rate of the incoming data. This may be the case, for example, where the threshold adaptation loop does not need to be updated at a relatively fast rate.

As represented by blocks 1010-1012, the process may only store data associated with a portion of the ADC levels. In the event the data from the ADC is one of the selected bins (e.g., bins 6-11) the corresponding bin may be incremented. Otherwise the ADC data may be ignored or discarded. It should be appreciated that the teachings of the invention may be incorporated into a system that uses a different number of bins, ADC levels, selected bins, etc., than specifically mentioned herein.

As represented by block 1014, the process determines whether to remain in a collection loop, exit the loop or adjust the threshold based on the collected histogram. For example, the process may remain in the histogram collection loop by returning to block 1004. Alternatively, the process may exit the loop to return at some later point in time as discussed above. At some point a sufficient amount of histogram data will be acquired such that a new decision may be made as to whether the threshold needs to be adjusted. In this case the process passes to block 1018.

At block 1018 a determination may be made as to whether the middle bins are zero. If so the process may use bins 7-10 (or some other combination of bins) for the error function (block 1020). Alternatively the process may use bins 6, 7, 10 and 11 (or some other combination of bins) for the error function (block 1022).

As represented by block 1024, the process either calculates the error function Err using the log of the bin counts as discussed above or by setting Err to 1/mu or −1/mu. It should be appreciated, however, that the error function may be calculated using other techniques. For example, different equations may be used to represent the tails. Different values may be used instead of 1/mu or −1/mu. In addition, the error function may be based on other ways of processing the histogram information. In a simplified embodiment the process may make a threshold adjustment based simply on the values in the bins. For example, the process may adjust the threshold to ensure that, for example, two bins (e.g., the two smallest bins) have the same or approximately the same number of hits.

As represented by block 1026, the process adjusts the threshold in accordance with an update function. In some embodiments, the amount the threshold may be adjusted may be limited. For example, the total threshold adjustment may be limited to ±30% of the height of the eye window. Again, it should be appreciated that update functions other than those disclosed may be used in view of the teachings herein.

The process then exits the loop to return at some later point in time as discussed at the beginning of this section. In this way the process may provide adaptive adjustment of the threshold since the next invocation of the process will calculate a new error function based on the new (presumably smaller) threshold error.

Figure 11:
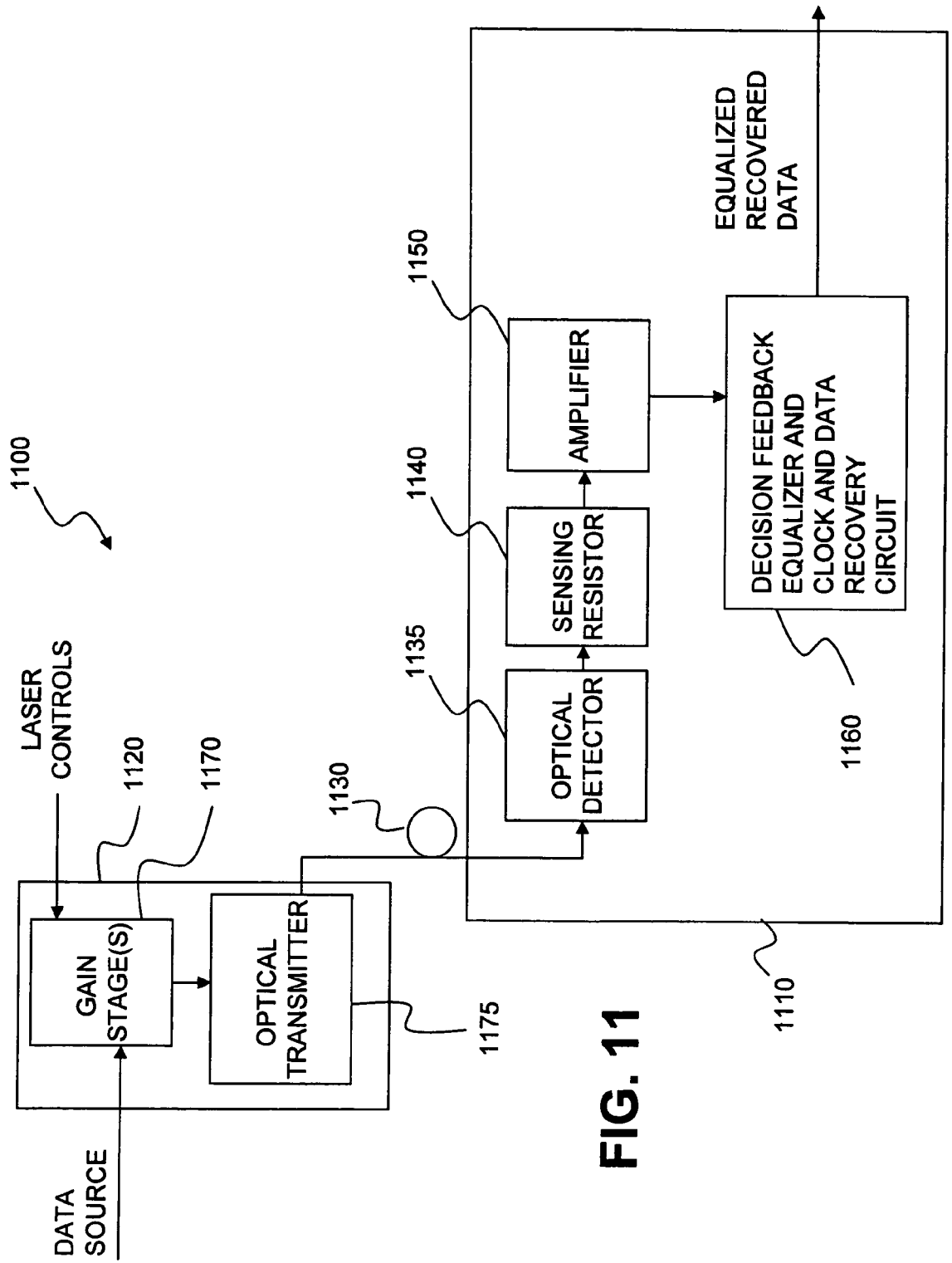
FIG. 11 is a simplified block diagram of one embodiment of an optical communication system.

The teachings herein may be incorporated into a variety of applications. For example, referring to FIG. 11, the described circuits may be incorporated into an optical receiver assembly 1110 of an optical communication system 1100. The optical system 1100 includes an optical transmitter 1120 and an optical fiber network 1130 that carries the optical signal to the optical receiver assembly 1110. Those skilled in the art will appreciate that the present invention is not limited to a single optical transmitter and receiver. Rather practical optical communications systems may have one or more optical transmitters as well as one or more optical receivers.

The illustrated receive path includes an optical detector 1135, sensing resistor 1140, one or more amplifiers 1150, clock and data recovery circuit 1160, and decision feedback equalizer 1165. The optical detector 1135 can be any known prior art optical detector. Such prior art detectors convert incoming optical signals into corresponding electrical output signals that can be electronically monitored.

A transmit path includes, by way of example, one or more gain stage(s) 1170 coupled to an optical transmitter 1175. In one embodiment an analog data source provides an analog data signal that modulates the output of the optical transmitter. In other embodiments baseband digital modulation or frequency modulation may be used. In this embodiment the gain stage(s) amplify the incoming data signal and the amplified data signal in turn drives the optical transmitter 1175.

The gain stage 1170 may have multiple stages, and may receive one or more control signals for controlling various different parameters of the output of the optical transmitter. The optical transmitter may, for example, be a light emitting diode or a surface emitting laser or an edge emitting laser that operates at high speeds such as 10 Gigabits per second (Gbps) or higher.

A receive fiber optic cable 1130 carries an optical data signal to the optical detector 1135. In operation, when the transmitted optical beam is incident on a light receiving surface area of the optical detector, electron-hole pairs are generated. A bias voltage applied across the device generates a flow of electric current having an intensity proportional to the intensity of the incident light. In one embodiment, this current flows through sensing resistor 1140, and generates a voltage.

The sensed voltage is amplified by the one or more amplifiers 1150 and the output of amplifier 1150 drives the decision feedback equalizer 1165. As illustrated in FIG. 4, the decision feedback equalizer, includes, by way of example, a slicer that generates a binary signal (D3) that drives the clock and data recovery circuit 1160. The clock and data recovery circuit generates an extracted clock signal from the binary signal which is coupled to a decision feedback equalizer retimer to retime the equalized data.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire while other signals may consist of light pulses transmitted over an optical fiber.

A signal may comprise more than one signal. For example, a signal may consist of a series of signals. Also, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories discussed herein. For example, a data memory may comprise flash memory, one-time-programmable (OTP) memory or other types of data storage devices.

In summary, the invention described herein generally relates to an improved signal processing system and method. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. For example, the threshold adaptation process may sample information other than the data specifically mentioned, the process may involve other approximations of the histogram data, other techniques may be used to adjust a threshold associated with a signal and other techniques may be used to determine the magnitude and direction that the threshold should be moved. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A threshold adjustment method employed by a communications apparatus, the method comprising:
    receiving an analog signal;
    adjusting a threshold of the received analog signal in accordance with a threshold adjust signal to generate a threshold adjusted signal;
    sampling the threshold adjusted signal to generate a sampled signal;
    generating a histogram from the sampled signal;
    processing the histogram to generate an error signal,
        wherein processing includes calculating a difference between y-intersects of at least two substantially straight curves defined by log values from the histogram, wherein the y-axis represents the distribution of the received signal; and
    generating the threshold adjust signal in accordance with the error signal.

2. The method of claim 1 comprising determining a threshold value in accordance with the difference between y-intersects.

3. The method of claim 1 wherein the sampling comprises under-sampling.

4. The method of claim 1 wherein the sampling comprises using a two-bit analog to digital converter.

5. The method of claim 1 wherein generating the threshold adjust signal comprises iteratively adjusting the threshold adjust signal.

6. The method of claim 1 wherein an optimum value for the threshold adjust signal is defined in accordance with a zero error function.

7. The method of claim 1 wherein adjusting the threshold associated with the received signal comprises adjusting a DC component of the received signal.

8. The method of claim 1 wherein processing comprises generating the error signal in accordance with at least one tail distribution defined by the histogram.

9. The method of claim 8 comprising providing at least one adaptation loop for adjusting signal quality of at least one of the received signal and the threshold adjusted signal in accordance with at least one error signal that is not based on a tail distribution.

10. The method of claim 9 wherein the at least one error signal comprises a squared error signal derived from the sampled signal.

11. A communications system comprising:
a threshold adjust circuit configured to adjust a threshold of a received signal in accordance with a threshold adjust signal to generate a threshold adjusted signal;
an analog to digital converter configured to sample the threshold adjusted signal in accordance with a clock signal to generate a sampled signal; and
a threshold adjust loop configured to:
generate a histogram from the sampled signal;
calculate a difference between y-intersects of at least two substantially straight curves defined by log values from the histogram, wherein the y-axis represents the distribution of the received signal;
process the histogram to generate an error signal; and
generate the threshold adjust signal in accordance with the error signal.

12. The system of claim 11 wherein the threshold adjust loop is configured to determine a threshold value in accordance with the difference between y-intersects.

13. The system of claim 11 wherein the threshold adjust loop is configured to iteratively adjust the threshold adjust signal.

14. The system of claim 11 wherein the analog to digital converter comprises a two-bit analog to digital converter.

15. The system of claim 11 wherein an optimum value for the threshold adjust signal is defined in accordance with a zero error function.

16. The system of claim 11 wherein the threshold adjust circuit is configured to adjust a DC component of the received signal to generate the threshold adjusted signal.

17. The system of claim 11 wherein the threshold adjust loop comprises at least one data memory for storing the histogram.

18. The system of claim 11 comprising a slicer configured to slice the threshold adjusted signal in accordance with a slicer threshold.

19. The system of claim 11 wherein the threshold adjust loop is configured to generate the error signal in accordance with at least one tail distribution defined by the histogram.

20. The system of claim 19 comprising at least one adaptation loop for adjusting signal quality of at least one of the received signal and the threshold adjusted signal in accordance with at least one error signal that is not based on a tail distribution.

21. The system of claim 20 wherein the at least one error signal comprises a squared error signal derived from the sampled signal.

22. A communications apparatus comprising:
receiving means for receiving an analog signal;
adjusting means for adjusting a threshold of the received analog signal in accordance with a threshold adjust signal to generate a threshold adjusted signal;
sampling means for sampling the threshold adjusted signal to generate a sampled signal;
histogram generating means for generating a histogram from the sampled signal;
processing means for processing the histogram to generate an error signal,
wherein the processing means includes a calculating means for a difference between y-intersects of at least two substantially straight curves defined by log values from the histogram, wherein the y-axis represents the distribution of the received signal; and
signal generating means for the threshold adjust signal in accordance with the error signal.

23. The apparatus of claim 22 comprising determining means for determining a threshold value in accordance with the difference between y-intersects.

24. The apparatus of claim 22 wherein comprising at least one adaptation loop for adjusting signal quality of at least one of the received signal and the threshold adjusted signal in accordance with at least one error signal that is not based on a tail distribution defined by the histogram.

25. The apparatus of claim 22 wherein the error signal comprises a squared error signal derived from the sampled signal.

* * * * *